(12) United States Patent
Kumar et al.

(10) Patent No.: US 10,862,922 B2
(45) Date of Patent: Dec. 8, 2020

(54) SERVER SELECTION FOR OPTIMIZED MALWARE SCAN ON NAS

(71) Applicant: EMC IP Holding Company LLC, Hopkinton, MA (US)

(72) Inventors: Shiv Shankar Kumar, Pune (IN); Jai Prakash Gahlot, Pune (IN); Amit Kumar Chauhan, Pune (IN)

(73) Assignee: EMC CORPORATION, Hopkinton, MA (US)

( * ) Notice: Subject to any disclaimer, the term of this patent is extended or adjusted under 35 U.S.C. 154(b) by 210 days.

(21) Appl. No.: 16/026,906

(22) Filed: Jul. 3, 2018

(65) Prior Publication Data

US 2020/0014704 A1  Jan. 9, 2020

(51) Int. Cl.
*H04L 29/00* (2006.01)
*H04L 29/06* (2006.01)

(52) U.S. Cl.
CPC ........ *H04L 63/145* (2013.01); *H04L 63/1416* (2013.01)

(58) Field of Classification Search
CPC ... H04L 63/145; H04L 63/1416; H04L 63/20; H04L 63/1441
See application file for complete search history.

(56) References Cited

U.S. PATENT DOCUMENTS

| | | | | |
|---|---|---|---|---|
| 9,203,851 | B1* | 12/2015 | Wang | H04L 63/1408 |
| 2006/0050686 | A1* | 3/2006 | Velez-Rivera | H04M 3/493 |
| | | | | 370/352 |
| 2008/0320548 | A1* | 12/2008 | Tripathi | G06F 21/552 |
| | | | | 726/1 |
| 2012/0185652 | A1* | 7/2012 | Peters | G06F 3/067 |
| | | | | 711/152 |
| 2014/0245376 | A1* | 8/2014 | Hibbert | H04L 63/1433 |
| | | | | 726/1 |
| 2015/0169849 | A1* | 6/2015 | Takemoto | G06F 21/105 |
| | | | | 726/27 |
| 2015/0173019 | A1* | 6/2015 | Sen | H04W 8/005 |
| | | | | 455/41.2 |
| 2016/0080394 | A1* | 3/2016 | Guo | H04L 63/145 |
| 2016/0224788 | A1* | 8/2016 | Coronado | G06F 21/566 |
| 2017/0257303 | A1* | 9/2017 | Boyapalle | H04L 67/34 |
| 2017/0337377 | A1* | 11/2017 | Vlaznev | G06F 21/564 |
| 2018/0227314 | A1* | 8/2018 | Galchenko | G06F 9/5027 |

* cited by examiner

*Primary Examiner* — Don G Zhao
(74) *Attorney, Agent, or Firm* — Amin Turocy & Watson LLP

(57) ABSTRACT

Server selection for optimized malware scanning on network-attached storage systems is provided herein. A data storage system as described herein can include a memory that stores computer executable components and a processor that executes computer executable components stored in the memory. The computer executable components can include a load determination component that determines respective available capacities of anti-malware servers based on loading information obtained from the anti-malware servers and a task assignment component that assigns a malware scan task to a selected anti-malware server of the anti-malware servers based on the respective available capacities of the anti-malware servers.

17 Claims, 9 Drawing Sheets

400

| Server ID | Active connections | Available capacity $f(x)$ | Heartbeat node ID |
|---|---|---|---|
| 1 | 14 | 56 | 1 |
| 2 | 0 | 0 | 2 |
| 3 | 9 | 33 | 7 |
| 4 | 20 | 0 | 8 |
| 5 | 0 | 0 | 5 |

FIG. 4

SERVER SELECTION FOR OPTIMIZED MALWARE SCAN ON NAS

TECHNICAL FIELD

The subject application is related to data storage, and more particularly, to techniques for managing data security in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. In addition to providing a means for storing data, an NAS platform can implement one or more data security and/or protection techniques to ensure the integrity of data stored on the platform. For instance, an NAS platform can perform and/or manage scanning of respective files stored on the platform for viruses or other forms of malware according to one or more scanning policies.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a load determination component that determines respective available capacities of anti-malware servers based on loading information obtained from the anti-malware servers and a task assignment component that assigns a malware scan task to a selected anti-malware server of the anti-malware servers based on the respective available capacities of the anti-malware servers.

In another aspect, a method is described herein. The method can include obtaining, by a device operatively coupled to a processor, available capacity information for respective ones of anti-malware servers based on loading information obtained from the respective ones of the anti-malware servers, and assigning, by the device, a malware scan task to a selected anti-malware server of the anti-malware servers based on the available capacity information for the respective ones of the anti-malware servers.

In an additional aspect, a machine-readable medium including computer executable instructions is described herein. The instructions, when executed by a processor, can facilitate performance of operations including obtaining available capacity information for respective ones of anti-malware servers based on loading information obtained from the respective ones of the anti-malware servers and assigning a malware scan task to a selected anti-malware server of the anti-malware servers based on the available capacity information for the respective ones of the anti-malware servers.

DESCRIPTION OF DRAWINGS

Various non-limiting embodiments of the subject disclosure are described with reference to the following figures, wherein like reference numerals refer to like parts throughout unless otherwise specified.

FIG. 4 is a diagram depicting an example data structure that can be utilized to store server capacity data in accordance with various aspects described herein.

DETAILED DESCRIPTION

Figure 1:
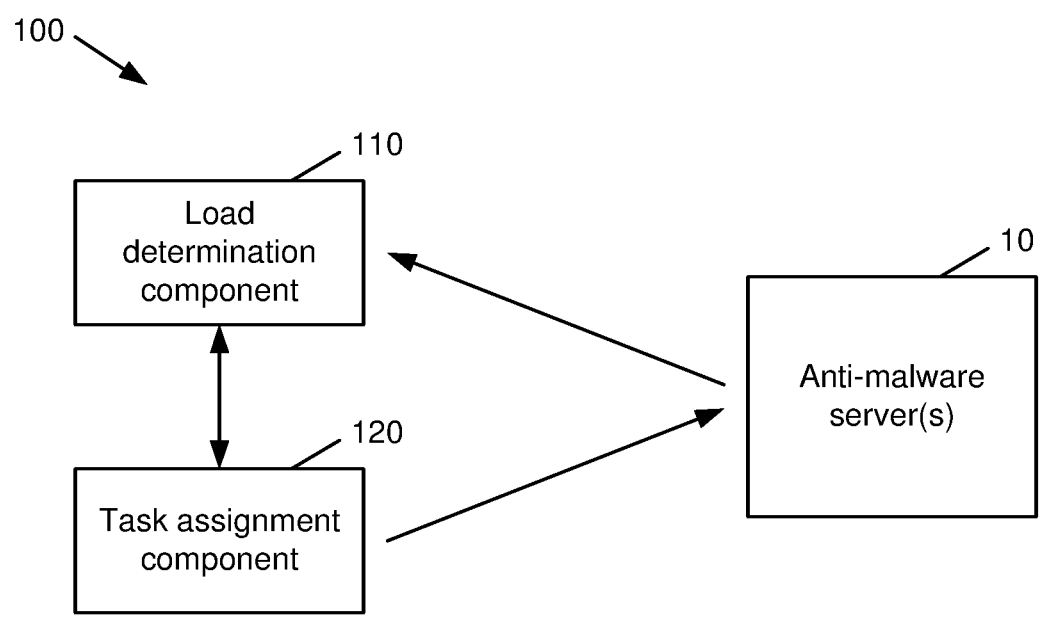
FIG. 1 is a block diagram of a system that facilitates server selection for malware scan tasks for an NAS system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for various types of data, which can provide a functionally unlimited amount of storage space for multiple users via a seamless single volume and a single file system. Additionally, NAS platforms and/or systems can leverage one or more antivirus servers (AVSs) or other anti-malware servers to prevent malware-infected files from entering or residing in storage. For instance, files that are stored and/or accessed in an NAS system can be scanned (e.g., in real time and/or according to scheduled or forced scans) for viruses or other malware by anti-malware servers external to respective NAS clusters.

When a client requests access to a file stored on an NAS system, the file can first be scanned by one or more remote AVSs. Also or alternatively, files stored on an NAS system can be scanned via forced and/or scheduled scan tasks. In order for an NAS system to facilitate file scans by external AVSs, the system can submit scan requests to one of a group of associated and active AVSs. However, when remote AVSs are configured for use with a given NAS system, some of the remote servers may be more powerful than others in terms of processor capacity, available memory, disk size, network bandwidth, updated licenses for virus and/or other malware definitions, etc. Further, because some scan requests can take more time than others (e.g., depending on the size, type, and/or other properties of the file(s) being scanned), some AVSs may be busier than other associated servers at a given time.

To the foregoing and/or related ends, various embodiments described herein provide techniques by an NAS system can select an AVS with sufficient capacity to efficiently serve respective scan requests, thereby distributing malware scan load among a group of AVSs per their respective capacities in a substantially real-time manner. As a result of the techniques described herein, the time efficiency of malware scans can be increased. For instance, the techniques described herein can improve the efficiency and/or functionality of computing systems in time-sensitive environments such as those in the finance, healthcare, or aviation sectors, as well as computing environments in sectors such as media or entertainment that utilize a high volume of large (e.g., high-definition video and/or audio) files.

Various embodiments described herein can provide one or more benefits that improve the functionality of an NAS system and/or an associated AVS. A non-exhaustive list of such benefits is as follows. Wait times for malware scan tasks as observed by a user of an NAS system can be reduced. Resource utilization at respective AVSs can be improved, thereby reducing inefficiency associated with overutilization or underutilization of respective AVSs. System malware scan throughput can be increased. Other benefits that result in improvements to the operation of an NAS system and/or an associated AVS are also possible.

With reference now to the drawings, FIG. 1 illustrates a system 100 that facilitates server selection for malware scan tasks for an NAS system in accordance with various aspects described herein. In an aspect, system 100 can be, or can be implemented as part of, an NAS platform and/or other computing platforms on which data sets of varying scope and/or size are desirably stored. As shown in FIG. 1, system 100 can include a load determination component 110 and a task assignment component 120. The load determination component 110 and task assignment component 120 can be implemented via one or more NAS devices, such as an NAS controller or computing node and/or any other suitable computing device(s) comprising a memory operatively coupled to a processor.

In an aspect, the load determination component 110 can determine respective available capacities of anti-malware servers 10 based on loading information obtained from respective ones of the anti-malware servers 10. Based on the respective available capacities of the anti-malware servers 10 as determined by the load determination component 110, the task assignment component 120 can assign a malware scan task to a selected anti-malware server 10 of the anti-malware servers 10. Operation of the load determination component 110 and the task assignment component 120 are described in further detail below In an aspect, the load determination component 110 and/or task assignment component 120 can be implemented via a NAS node device and/or another suitable device that provides an interface to data storage implemented via, e.g., individual data drives or logical and/or physical groups of drives. Logical groups of data drives can include Redundant Array of Independent Disks (RAID) arrays and/or any other groups of hard drives that are logically coupled in any suitable manner Physical groups of drives can include drive racks, sleds, and/or any other physical grouping of data drives.

When a malware scan task for one or more files associated with the data storage is initiated (e.g., by a client requesting access to a file, a scheduled or forced scan, etc.), the NAS node device, via the load determination component 110 and/or task assignment component 120, can facilitate one or more malware scan tasks based on capacity information associated with the anti-malware servers 10 as described herein. By taking server capacity into account when selecting a server for a given malware scan task, various embodiments described herein can provide improved malware scan performance over that associated with load-agnostic server selection techniques.

In an aspect, the load determination component 110 and the task assignment component 120 can be implemented via a same device or multiple devices. For instance, the load determination component 110 can be implemented by a first device, and the task assignment component 120 can be implemented by the first device or a second device. Also or alternatively, the functionality of respective components as described herein can be distributed among multiple computing devices.

Figure 2:
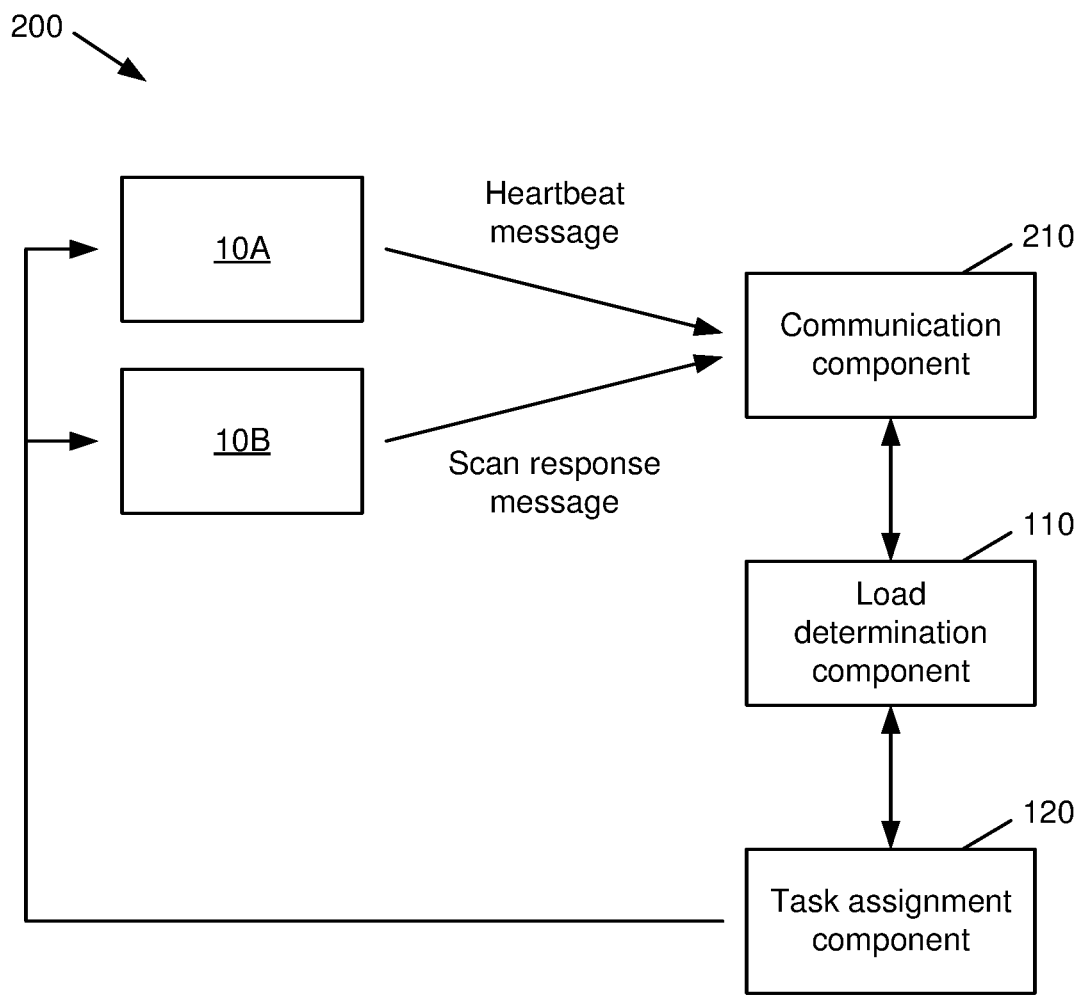
FIG. 2 is a block diagram of a system that facilitates receiving and processing server load information in accordance with various aspects described herein.

Turning next to FIG. 2, a block diagram of a system 200 that facilitates receiving and processing server load information in accordance with various aspects described herein is illustrated. Repetitive descriptions of like parts described in previous embodiments herein is omitted for the sake of brevity. As shown by FIG. 2, system 200 includes a communication component 210 that receives loading information from respective anti-malware servers 10, here two anti-malware servers 10A and 10B, via respective messages received from the anti-malware servers. While two anti-malware servers 10 are illustrated in system 200 for clarity of illustration, it should be appreciated that system 200 could support any suitable number of anti-malware servers 10 using techniques that are similar to those described herein. In an aspect, the communication component 210 can be implemented by and/or otherwise associated with a common computing device, e.g., a NAS node device that also implements the load determination component 110 and task assignment component 120 as described above with respect to FIG. 1. Other implementations are also possible.

As shown by FIG. 2, the communication component 210 can receive current load data relating to respective anti-malware servers 10 across respective performance parameters or metrics. The load determination component 110 can then determine the available capacity of a given computer executable instructionsanti-malware server 10 based on performance metrics associated with that anti-malware server. Performance metrics utilized by the load determination component 110 can be obtained via the communication component 210 as shown by FIG. 2 and/or obtained in any other suitable manner. For instance, the load determination component 110 could in some implementations communicate with respective anti-malware servers 10 directly to obtain corresponding performance metrics. Other implementations are also possible.

As further shown by FIG. 2, current load data associated with respective anti-malware servers 10 can be communicated by the anti-malware servers 10 to the communication component 210 and/or other appropriate components of system 200 via respective messages sent from the anti-malware servers 10 to the communication component 210, such as heartbeat messages and/or scan response messages sent from one or more of the anti-malware servers 10. By way of specific, non-limiting example, server load data can be sent with heartbeat response messages and/or other heartbeat messages, as illustrated by the communication from anti-malware server 10A to the communication component 210 as shown in FIG. 2. As another example, current load data can be piggybacked and/or otherwise combined with file scan responses, as illustrated by the communication from anti-malware server 10B to the communication component 210 as shown in FIG. 2. As a further example, the communication component 210 and/or other components of system 200 could send a message to an anti-malware server 10 that explicitly requests current load data, to which the requested anti-malware server could provide the requested data in a responsive message. Other techniques could also be used.

In an aspect, the load determination component 110 can determine the available capacity of a given anti-malware server 10 based on performance metrics and/or other current load information for the anti-malware server as provided from the anti-malware server 10 as described above. Performance metrics that can be utilized by the load determination component to determine the available capacity of a given anti-malware server can include, but are not limited to, a historical server scan throughput of the anti-malware server, an available server processor capacity of the anti-malware server, an available server memory capacity of the anti-malware server, cache memory availability at the anti-malware server, an anti-malware software version running on the anti-malware server, etc.

In one example, the load determination component 110 can utilize a function $f(x)$ to determine the available capacity of a given anti-malware server 10. The function $f(x)$ can be defined as follows:

$$f(x) = \frac{s[m(scanRate) + n(100 - c) + p(100 - r)]}{m + n + p},$$

where s indicates server status (e.g., s=1 for an active server and 0 for an inactive server), m is a scan rate weighting parameter, scanRate is an average (historical) server scan throughput (e.g., in bytes), c indicates processor utilization percentage, n is a processor capacity weighting parameter, r indicates memory utilization percentage, and p is a memory utilization weighting parameter. The output of function $f(x)$ is a number (e.g., from 0 to 100) that indicates the relative available capacity of the associated anti-malware server 10. It should be appreciated that the output of function $f(x)$ can be utilized by the load determination component 110 and/or task assignment component 120 as a preference score, and that this preference score need not be applicable for purposes other than providing a basis for malware scan task allocation.

In an aspect, the task assignment component 120 can utilize a preference score and/or other metric obtained by function $f(x)$ as described above to select an anti-malware server 10 for a given malware scan task, e.g., by selecting an anti-malware server 10 having a highest preference score subject to one or more conditions. Techniques by which a preference score and/or related parameters can be utilized for assigning malware scan tasks are described in further detail below with respect to FIG. 6.

Figure 3:
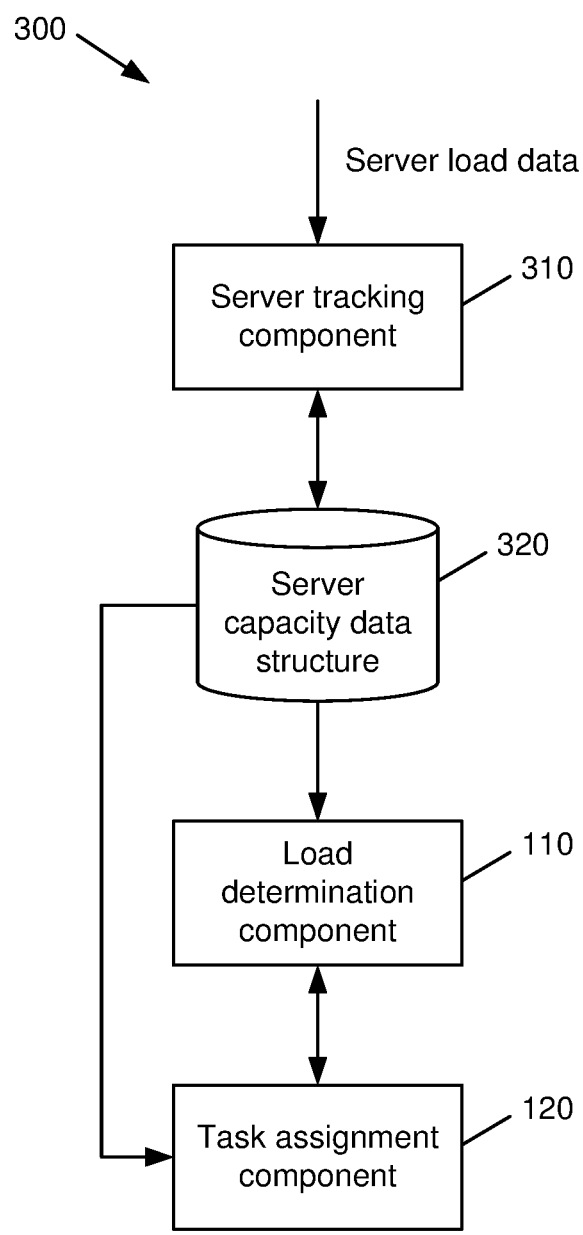
FIG. 3 is a block diagram of a system that facilitates tracking and maintaining server load information in accordance with various aspects described herein.

Referring now to FIG. 3, a block diagram of a system 300 that facilitates tracking and maintaining server load information in accordance with various aspects described herein is illustrated. Repetitive descriptions of like parts described in previous embodiments herein is omitted for the sake of brevity. As shown by FIG. 3, system 300 includes a server tracking component that receives server load data (e.g., from the communication component 210 shown in system 200 or respective anti-malware servers 10 directly) and maintains a data structure 320 that stores information relating to the respective available capacities of associated anti-malware servers 10. In an aspect, the task assignment component 120 can determine a selected anti-malware server, e.g., for a malware scan task, based on information stored in the data structure 320.

By way of specific, non-limiting example, the data structure 320 can be maintained in a tabular format such as that shown by diagram 400 in FIG. 4. As shown by diagram 400, the server tracking component 310 can define the data structure 320 as an antivirus server capacity table (ASCT) and dynamically maintain the available capacity of respective AVSs, e.g., as calculated by function $f(x)$ as described above.

In an aspect, the ASCT can be indexed using server identifiers for the respective AVSs, which can be provided by the AVSs themselves or assigned to the respective AVSs by the server tracking component 310. As further shown by diagram 400, the ASCT can contain data relating to a number of currently active connections at the respective AVSs, the available capacity of the respective AVSs as determined by the function $f(x)$ given above, an identifier of the last NAS node that received a heartbeat response message from the respective AVSs, and/or other suitable information.

Figure 5:
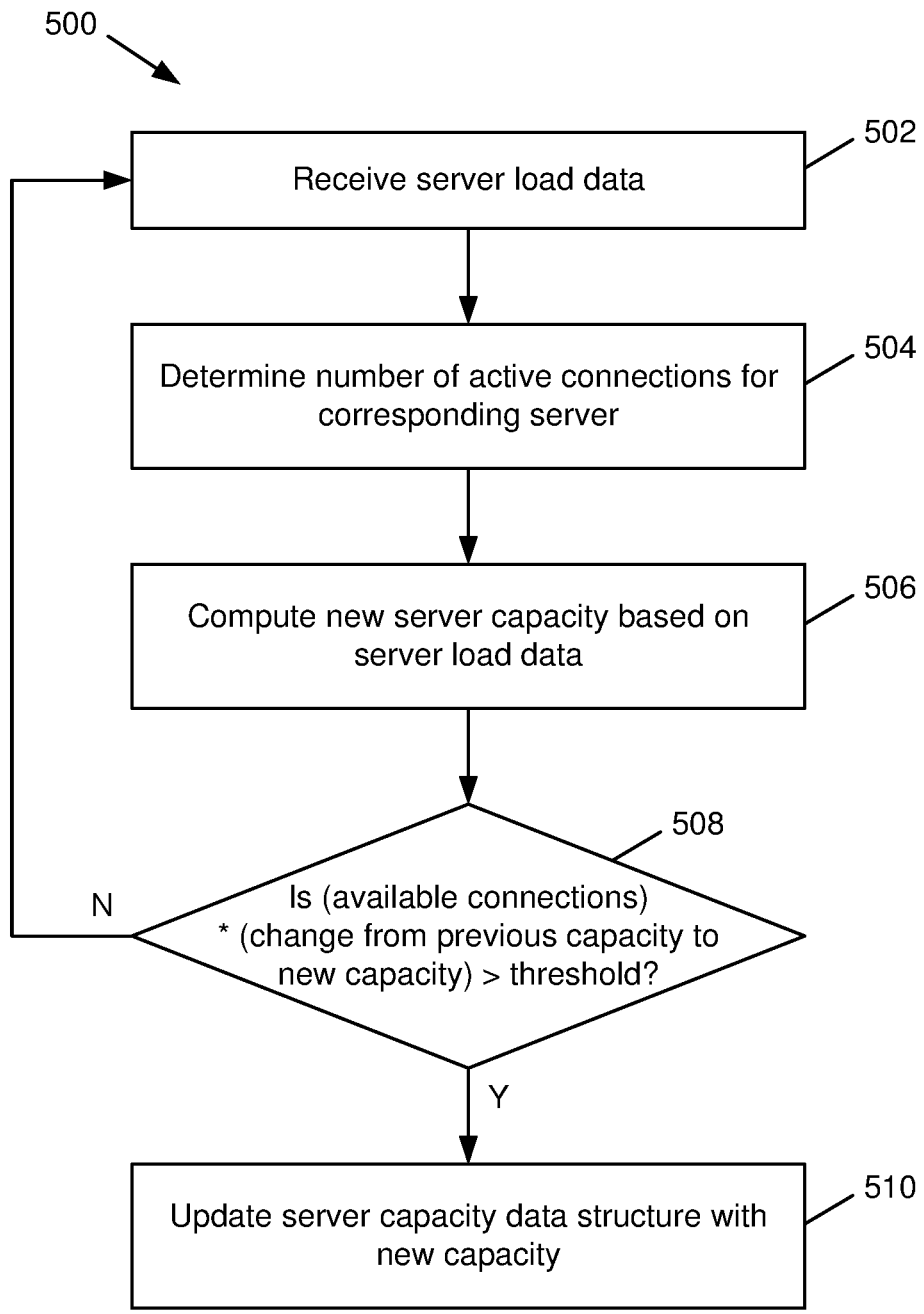
FIGS. 5-6 are flow diagrams of respective methods that facilitate updating a server capacity data structure in accordance with various aspects described herein.
Figure 6:
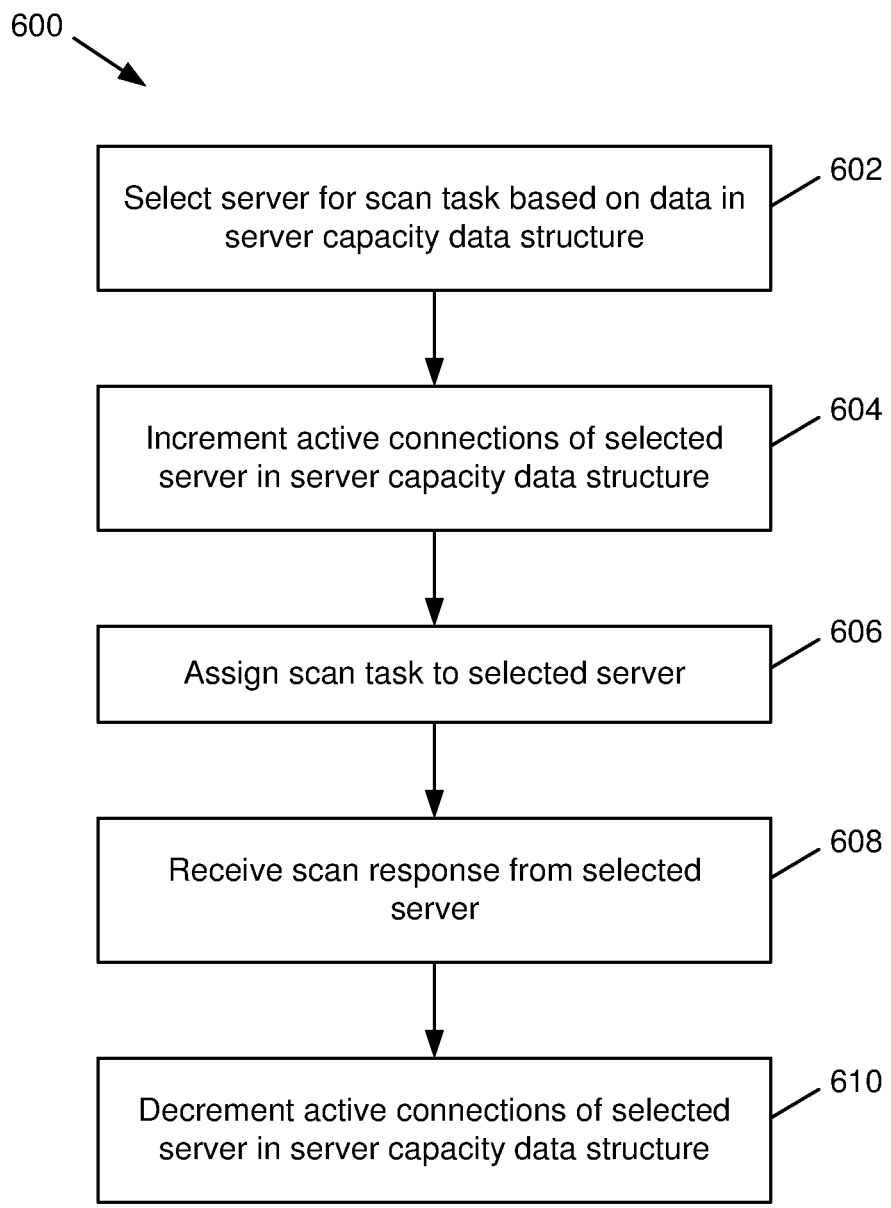

With reference to FIGS. 5-6, flow diagrams of respective methods are provided that illustrate respective process flows for maintaining the data structure 320 shown in FIG. 3, e.g., by the server tracking component 310 and/or by other suitable components. It should be appreciated that the process flows shown by FIGS. 5-6 are provided as non-limiting examples and that other methods could also be used. It should be further appreciated that the respective actions described below with respect to FIGS. 5-6, where appropriate, can be performed by a computing device operatively coupled to and/or otherwise including at least one processor.

Turning to FIG. 5, a flow diagram of a method 500 that facilitates updating a server capacity data structure 320 is illustrated. At 502, server load data associated with an anti-malware server 10 can be received, e.g., by a communication component as described above with respect to FIG. 2.

Next, at 504, the number of active connections for the anti-malware server 10 from which server load data was received at 502 can be determined, e.g., by referencing existing data for the anti-malware server 10 in the data structure 320 via the server tracking component 310. In an aspect, the server tracking component 310 can also or alternatively obtain a previous server capacity for the anti-malware server 10 by referencing the existing data in the data structure 320 for the anti-malware server 10.

At 506, an updated server capacity for the anti-malware server can computed based on the server load data received at 502, e.g., by the load determination component based on the function $f(x)$ as described above with respect to FIG. 2.

At 508, the number of active connections for the anti-malware server as determined at 504 and the change in available capacity of the anti-malware server from the previous capacity to the new capacity computed at 506 can be compared (e.g., by the server tracking component 310) to a threshold value. More particularly, the server tracking component can perform the determination at 508 by evaluating $[(K-a) \times |(\bar{f} - f(x))|]$, where K is the maximum number of connections supported by the anti-malware server 10, a is the number of active connections for the anti-malware server as determined at 504, ƒ is the previous available capacity of the anti-malware server 10, and ƒ(x) is the new server capacity as computed at 506.

If the resulting value of the determination performed at 508 is greater than the configured threshold, method 500 can proceed to 510, in which the server capacity data structure 320 can be updated (e.g., by the server tracking component 310) with the new capacity computed at 506. Otherwise, this update can be omitted and method 500 can return to 502 for further load data.

In an aspect, the determination performed at 508 can be performed in order to update the data structure 320 only when updated loading information for an anti-malware server 10 indicates change in available capacity of at least a threshold. Doing so can prevent minor fluctuations in processor, memory, and/or other utilizations from resulting in excessive updates to the data structure 320, thereby improving system efficiency associated with updating the data structure 320.

Referring now to FIG. 6, a flow diagram of a method 600 that facilitates utilizing the server capacity data structure 320 to perform improved server selection is illustrated. In general, a NAS device and/or other computing device that desirably assigns malware scan tasks to one or more associated remote servers can utilize method 600 for selecting an optimal server for efficient file scanning.

Method 600 begins at 602, in which a server can be selected (e.g., by the task assignment component 120) for a scan task based on data stored in the server capacity data structure 320. For instance, a server can be selected based on its current number of active connections, its available capacity as scored by function ƒ(x) and/or by other means, or by any other suitable information stored in the data structure 320. In one example, a server can be selected at 602 at least in part by evaluating $[(K-a) \times f(x)]$ for respective servers in a similar manner to that described above with respect to FIG. 5 and selecting a server with the highest evaluated value, a server with an evaluated value of at least a threshold, and/or according to other criteria.

Upon selection of a server at 602, the number of active connections for the selected server as recorded in the server capacity data structure 604 can be incremented (e.g., by the server tracking component 310), and the task can be assigned to the selected server (e.g., by the task assignment component 120) at 606.

At 608, a scan response can be received (e.g., by the communication component 210) from the server selected at 602 upon the selected server completing the assigned scan task. In response to receiving the scan response at 606, the number of active connections for the selected server can be decremented (e.g., by the server tracking component 310) at 610 to reflect completion of the scan task.

In an aspect, the server capacity data structure 320 as described above can be maintained by a single computing device (e.g., a NAS node and/or controller) or multiple computing devices. To facilitate improved server performance across multiple computing nodes and/or other devices of a distributed system, changes made to the data structure 320 by one device in a system can be propagated to respective other devices of the system, thereby enabling each device in the system to utilize the most current server capacity information available.

Figure 7:
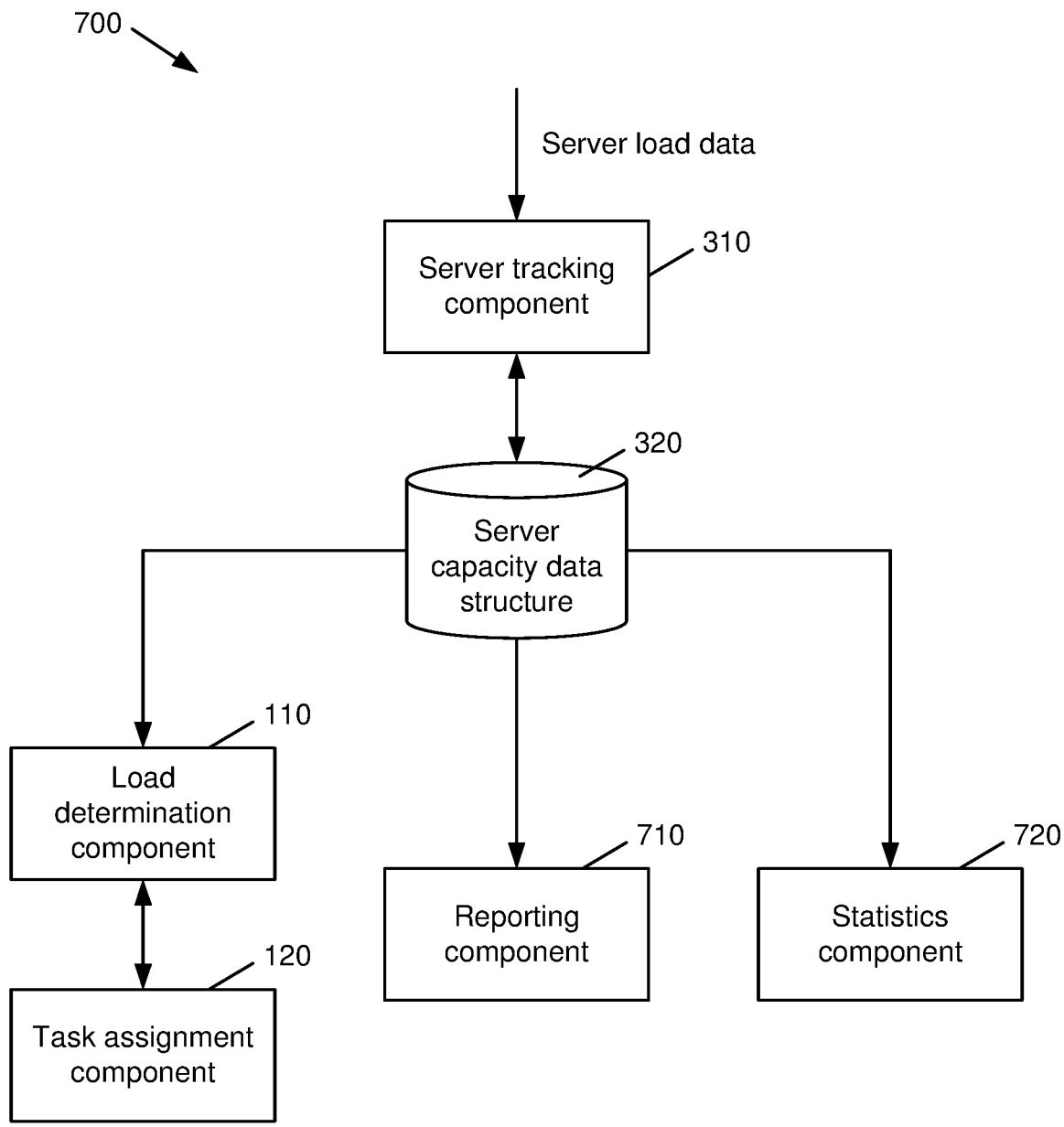
FIG. 7 is a block diagram of a system that facilitates generation and processing of server capacity data in accordance with various aspects described herein.

Referring now to FIG. 7, a block diagram of a system 700 that facilitates generation and processing of server capacity data in accordance with various aspects described herein is illustrated. Repetitive descriptions of like parts described in previous embodiments herein is omitted for the sake of brevity. As shown in FIG. 7, system 700 includes a server tracking component 310 that can generate and/or otherwise maintain a server capacity data structure 320 in accordance with various embodiments as described above. The server capacity data structure 320 can be utilized by a load determination component 110 and/or a task assignment component 120 in order to facilitate server selection for malware scan tasks as also described in accordance with the various embodiments above. In addition, the functionality of the server capacity data structure 320 in system 700 can be extended for additional uses, such as reporting and/or statistical purposes via a reporting component 710 and a statistics component 720, respectively. For instance, the reporting component 710 can facilitate real-time or near real-time reporting of active connections with respective anti-malware servers 10, and the statistics component 720 can facilitate generation of comparative utilization statistics for respective anti-malware servers 10. Other functions can also be performed by the reporting component 710 and/or statistics component 720. Also or alternatively, other uses of the server capacity data structure 320 and/or associated components than those shown in FIG. 7 could also be used.

Figure 8:
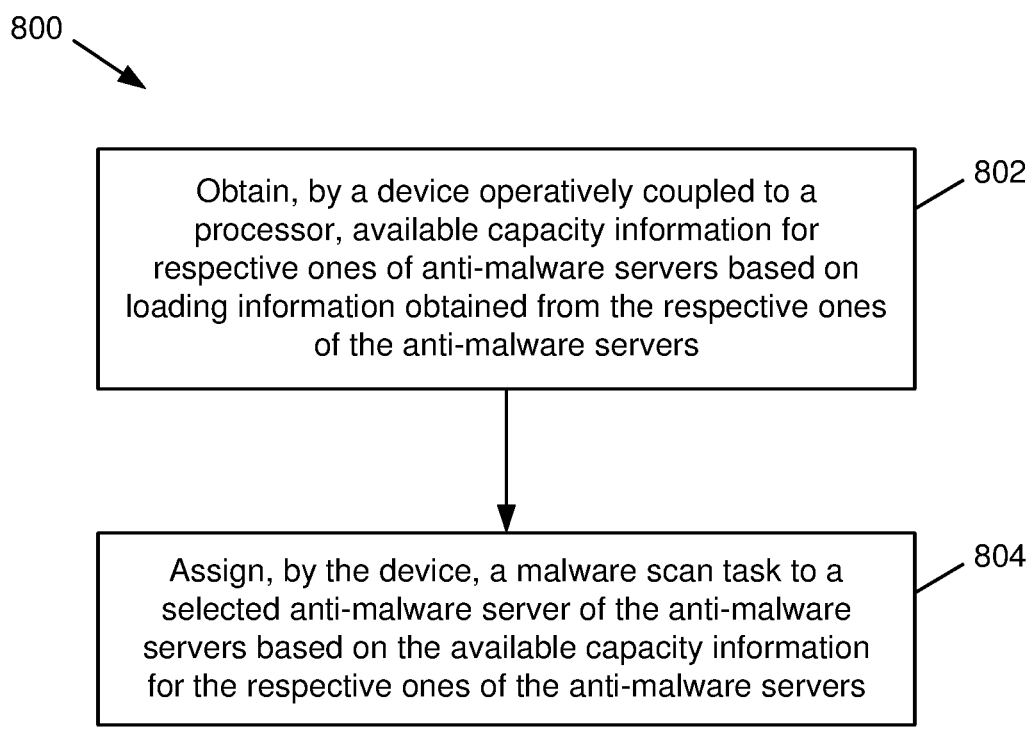
FIG. 8 is a flow diagram of a method that facilitates server selection for malware scan tasks for an NAS system in accordance with various aspects described herein.

With reference to FIG. 8, presented is a flow diagram of a method 800 that facilitates server selection for malware scan tasks for an NAS system in accordance with various aspects described herein. At 802, a device operatively coupled to a processor can obtain (e.g., via a load determination component 110) available capacity information for respective ones of anti-malware servers (e.g., anti-malware servers 10) based on loading information obtained from the respective ones of the anti-malware servers.

At 804, the device can assign (e.g., via a task assignment component 120) a malware scan task to a selected anti-malware server of the anti-malware servers for which capacity information is obtained at 802 based on the available capacity information for the respective ones of the anti-malware servers as obtained at 802.

FIGS. 5-6 and 8 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 9:
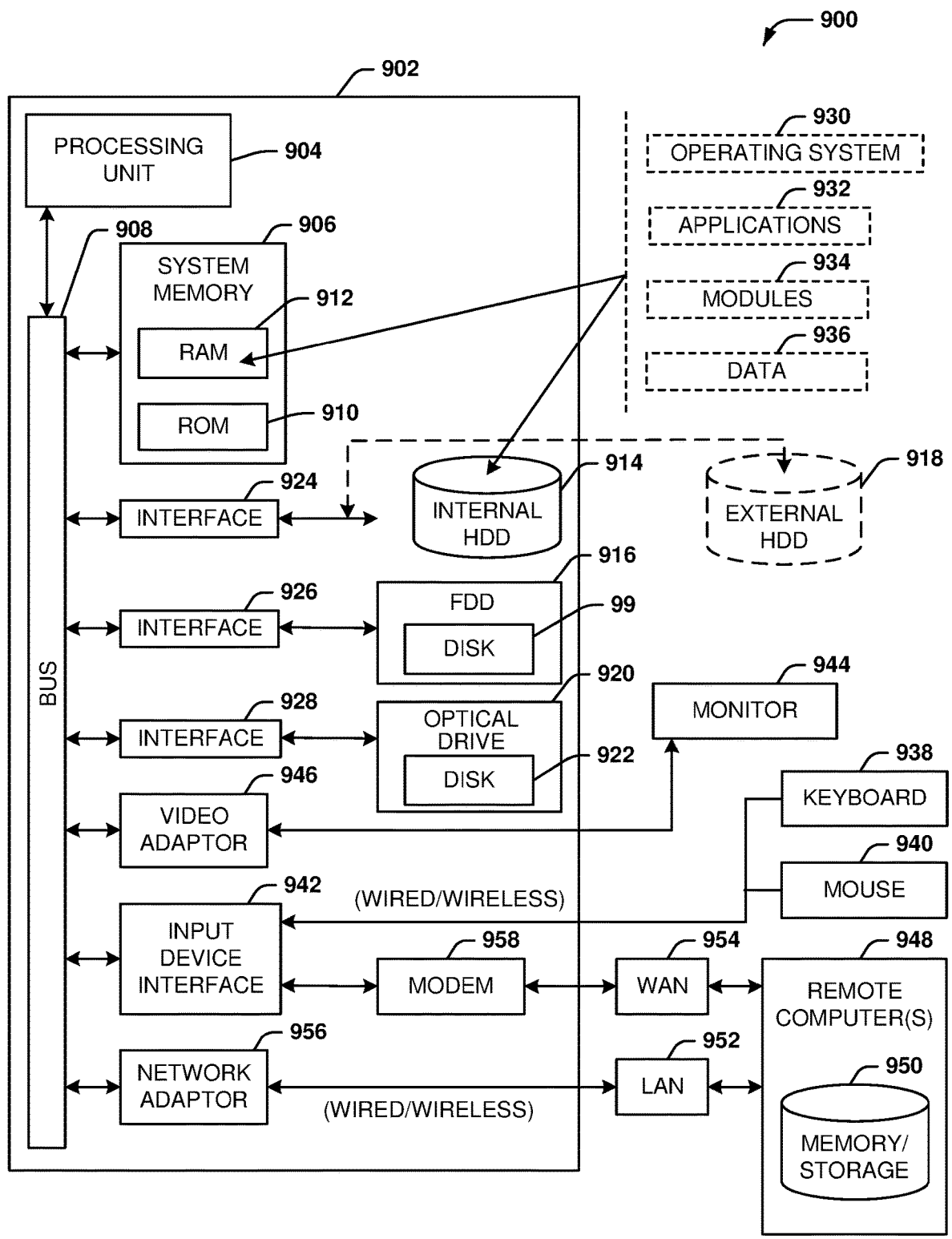
FIG. 9 is a diagram of an example computing environment in which various embodiments described herein can function.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). While the internal HDD 914 is illustrated as located within the computer 902, the internal HDD 914 can also be configured for external use in a suitable chassis (not shown). The HDD 914, magnetic FDD 916 and optical disk drive 920 can be connected to the system bus 908 by an HDD interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a USB port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless access point (AP) disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
a memory that stores computer executable instructions; and
a processor that executes the computer executable instructions stored in the memory to facilitate performance of operations, wherein the operations comprise:
determining respective available capacities of anti-malware servers based on loading information obtained from the anti-malware servers;
maintaining a data structure that stores information relating to the respective available capacities of the anti-malware servers;
determining a selected anti-malware server from the anti-malware servers based on the information stored in the data structure; and
assigning a malware scan task to the selected anti-malware server.

2. The data storage system of claim 1, wherein the operations further comprise determining the respective available capacities based on one or more performance metrics associated with the anti-malware servers.

3. The data storage system of claim 2, wherein the one or more performance metrics comprise at least one of historical server scan throughput of the anti-malware servers, available server processor capacities of the anti-malware servers, or available server memory capacities of the anti-malware servers.

4. The data storage system of claim 2, wherein the one or more performance metrics comprise at least one of cache memory availability at the anti-malware servers or anti-malware software versions running on the anti-malware servers.

5. The data storage system of claim 1, wherein the operations further comprise:
receiving the loading information from the anti-malware servers via respective messages received from the anti-malware servers, the respective messages comprising at least one of a heartbeat message or a scan response message from an anti-malware server of the anti-malware servers.

6. The data storage system of claim 1, wherein the operations further comprise:
obtaining updated loading information for a first anti-malware server of the anti-malware servers; and
updating the information relating to the available capacity of the first anti-malware server in the data structure in response to the updated loading information indicating a change in the available capacity of at least a threshold.

7. A method, comprising:
obtaining, by a device operatively coupled to a processor, available capacity information for respective ones of anti-malware servers based on loading information obtained from the respective ones of the anti-malware servers;
maintaining, by the device, a data structure that stores information relating to the available capacity information for the respective ones of the anti-malware servers;
determining, by the device, a selected anti-malware server of the anti-malware servers based on the information stored in the data structure; and
assigning, by the device, a malware scan task to the selected anti-malware server of the anti-malware servers.

8. The method of claim 7, wherein the obtaining comprises:
obtaining the available capacity information for the respective ones of the anti-malware servers based on one or more performance metrics associated with the respective ones of the anti-malware servers.

9. The method of claim 8, wherein the one or more performance metrics comprise at least one of historical server scan throughput information associated with the respective ones of the anti-malware servers, available server processor capacity information associated with the respective ones of the anti-malware servers, or available server memory capacity information associated with the respective ones of the anti-malware servers.

10. The method of claim 8, wherein the one or more performance metrics comprise at least one of a count of available connections at the respective ones of the anti-malware servers, cache memory availability at the respective ones of the anti-malware servers, or anti-malware software versions running on the respective ones of the anti-malware servers.

11. The method of claim 7, further comprising:
receiving, by the device, the loading information from the anti-malware servers via messages received from the anti-malware servers, the messages comprising at least one of a heartbeat message or a scan response message.

12. The method of claim 7, further comprising:
obtaining, by the device, updated loading information for a first anti-malware server of the anti-malware servers; and
updating, by the device, the information relating to the available capacity of the first anti-malware server in the data structure in response to the updated loading information indicating a change in the available capacity of at least a threshold.

13. A non-transitory machine-readable medium comprising computer executable instructions that, when executed by a processor, facilitate performance of operations, the operations comprising:
obtaining available capacity information for respective ones of anti-malware servers based on loading information obtained from the respective ones of the anti-malware servers;
maintaining a data structure that stores information relating to the available capacity information for the respective ones of the anti-malware servers; and
determining a selected anti-malware server of the anti-malware servers based on the information stored in the data structure; and
assigning a malware scan task to the selected anti-malware server.

14. The non-transitory machine-readable of claim 13, wherein the operations further comprise:
obtaining the available capacity information for the respective ones of the anti-malware servers based on one or more performance metrics associated with the respective ones of the anti-malware servers.

15. The non-transitory machine-readable medium of claim 14, wherein the one or more performance metrics comprise at least one of historical server scan throughput information associated with the respective ones of the anti-malware servers, available server processor capacity information associated with the respective ones of the anti-malware servers, available server memory capacity information associated with the respective ones of the anti-malware servers, a count of available connections at the respective ones of the anti-malware servers, cache memory availability at the respective ones of the anti-malware servers, or anti-malware software versions running on the respective ones of the anti-malware servers.

16. The non-transitory machine-readable medium of claim 13, wherein the operations further comprise:
receiving the loading information from the anti-malware servers via messages received from the anti-malware servers, the messages comprising at least one of a heartbeat message or a scan response message.

17. The non-transitory machine-readable medium of claim 13, wherein the operations further comprise:
obtaining updated loading information for a first anti-malware server of the anti-malware servers; and
updating the information relating to the available capacity of the first anti-malware server in the data structure in response to the updated loading information indicating a change in the available capacity of at least a threshold.

\* \* \* \* \*